July 25, 1950  V. F. CARRAHER  2,516,365
LAMINATED WHEEL AND PROCESS OF MANUFACTURING SAME
Filed Jan. 4, 1947  2 Sheets-Sheet 1

July 25, 1950  V. F. CARRAHER  2,516,365
LAMINATED WHEEL AND PROCESS OF MANUFACTURING SAME
Filed Jan. 4, 1947  2 Sheets-Sheet 2

Inventor
Vincent Francis Carraher
By Henry G. Sylvig
His Attorney

Patented July 25, 1950

2,516,365

UNITED STATES PATENT OFFICE 2,516,365

LAMINATED WHEEL AND PROCESS OF MANUFACTURING SAME

Vincent Francis Carraher, Rossmoyne, Ohio, assignor to Cincinnati Metalcrafts, Inc., Cincinnati, Ohio, a corporation of Ohio Application January 4, 1947, Serial No. 720,285

20 Claims. (Cl. 74—449)

This invention relates to a laminated wheel assembly and the production thereof and more particularly to a wheel used in the transmission of movement, although not necessarily so limited.

In the past, gears, sprocket wheels, V-belt pulleys, et cetera have generally been made by a process including the steps of finishing the peripheral surface thereof. For example, gears are generally made by the use of a hobbing machine for cutting the gears. V-belt pulleys are usually finished by finishing the V-groove. For some purposes, gears have been used that have been formed by means of a punch press, used in die forming the gear teeth. This process, however, is limited in the thickness of material that may be used.

An object of this invention is to provide a wheel, such as a gear, made from stampings, several stampings being juxtaposed upon one another and then secured together into a unitary structure to form a laminated wheel.

Another object of this invention is to form a laminated wheel made from a plurality of laminated sheets secured together in spots by welding, the spots for holding two laminations together being staggered with respect to spots holding other laminations together.

Another object of this invention is to provide a laminated wheel assembly including a hub provided with radially disposed flanges adapted to be nestled in notches formed in some of the laminations used in forming the wheel.

Another object of this invention is to provide a laminated wheel assembly that may be produced at a low cost, thereby resulting in economy of production and at the same time resulting in a wheel that is accurate, sturdy and dependable.

Other objects and advantages reside in the construction of parts, the combination thereof and the mode of operation, as will become more apparent from the following description.

Referring to the drawings, Figure 1 is a perspective view of a toothed wheel, disclosing the preferred embodiment.

Figure 6:
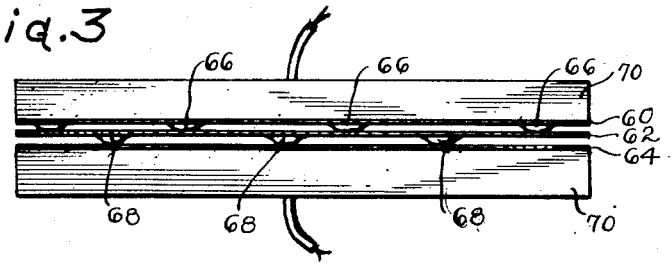

Figure 6 discloses a modification utilizing a plurality of discs or laminae, adapted to be secured together by projection welding.

In the drawings, the reference character 10 indicates a laminated wheel made from a plurality of laminations 12, 14 and 16 assembled upon a hub 18. The disc or lamina 12 is provided with a plurality of openings or holes 20 and a pair of aligning holes 22. For convenience in assembly, the aligning holes 22 are radially disposed with respect to the key way 24 in the hub 18. The disc or lamina 16 is provided with a plurality of holes 26 and the aligning holes 22. The disc or lamina 14 has no holes other than the aligning holes 22 and the opening 32 for the hub. The laminae 12 and 16 are each provided with a centrally disposed hole or aperture 30, through which the hub 18 extends. The lamina 14 is provided with the centrally disposed opening or aperture 32, having a plurality of radially disposed dovetailed notches 34, one for each of the radially disposed flanges 36 of the hub 18. The flanges 36 are slightly thicker than the thickness of the lamina 14.

In order to obtain a tight press-fit assembly, the laminations may be assembled upon the hub immediately after the hub has been contracted by a sub-zero temperature, without subjecting the laminations 12, 14 and 16 to the chilling temperature. If necessary, the temperature of the laminations may be raised above the room temperature.

Figure 1:
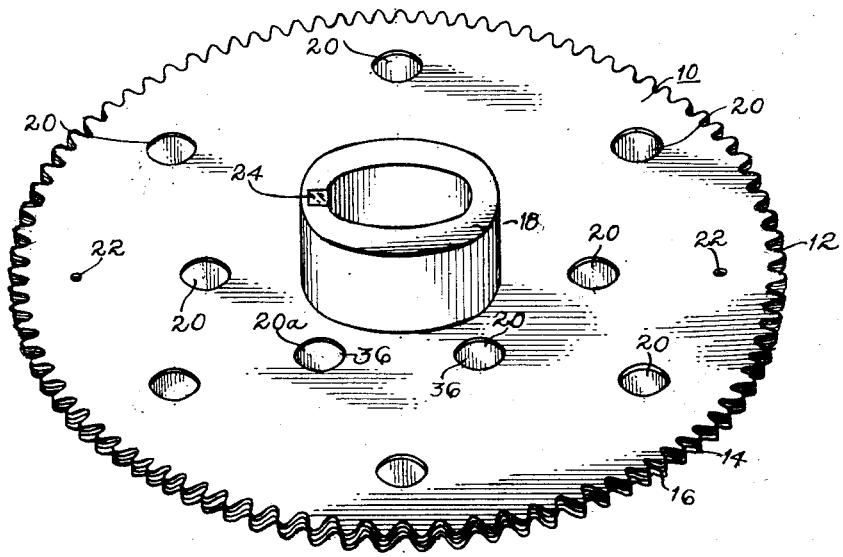
Figure 2:
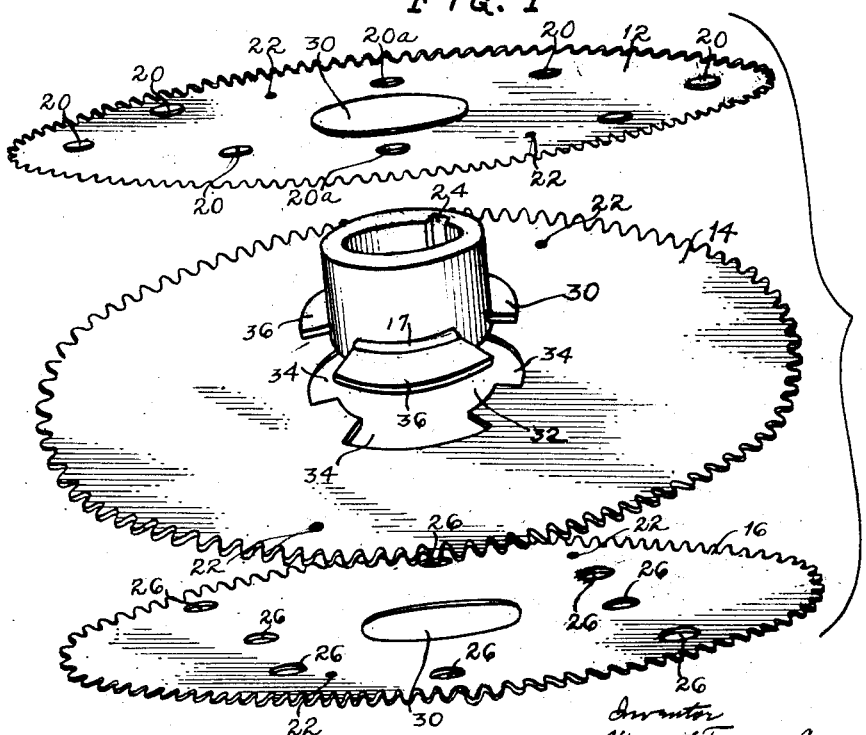
Figure 2 is an exploded view, showing the parts in readiness for assembly.
Figure 3:
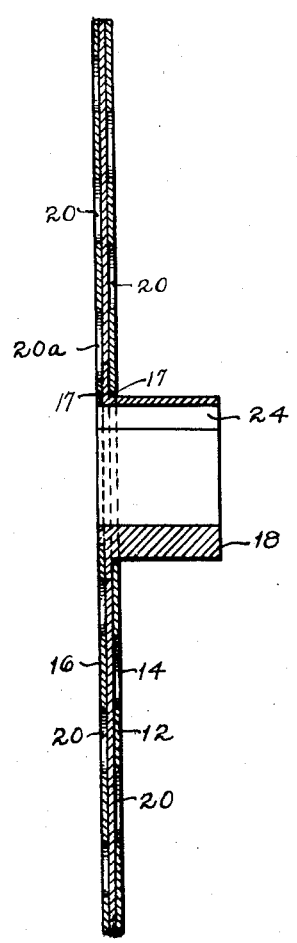
Figure 3 is a cross sectional view taken substantially on the line 3—3 of Figure 1.

As may best be seen by referring to Figure 3, the flanges 36 are subtended by arcuate ribs 17, cooperating with an arcuate surface of the laminations 14 and 16 to provide a rigid seat for the laminations and to reenforce the root of the flange.

In order to secure registry of the teeth, whether they be gear teeth or sprocket teeth, or they be cam sectors, pins, not shown, are projected through the holes 22, to thereby obtain accurate alignment. These pins hold the laminations in registry, so that the teeth on the periphery of the gear or sprocket, as the case may be, are in registry. Instead of peripheral teeth, the laminations may be provided with cam sectors, or the margins may be so designed that when assembled the laminations cooperate to form a V-belt groove.

After the laminations and the hub have been assembled, the laminations are then spot welded together. In order to successfully spot weld, only two laminations should be positioned between the electrodes of the spot welder. In order to accomplish this, the electrodes are projected through the holes 20 in the lamination 12 to spot weld the two laminations 14 and 16. The holes 20a near the hub 18 overlap the flanges 36, so that the flanges 36 are welded to the laminations 16.

In a like manner, the lamination 12 is spot welded to the lamination 14 and to the flanges 36. It can readily be seen that if the flanges 36 are slightly thicker than the lamination 14, the flanges 36 are clamped between the inner margin of the laminations 12 and 16. By this arrangement, it is quite apparent that a good rigid driving connection is established between the wheel 10 and the hub 18. In the first place, the flanges integral with the hub 18, are dovetailed into recesses in the lamination 14. Furthermore, the flanges 36 are spot welded to the laminations 12 and 16. In addition thereto, the flanges are clamped between the discs 12 and 16.

If the load on the wheel 10 is heavy, in other words, if, for example, the wheel is used as a gear and the load upon the gear is heavy, the hub may be designed to non-rotatably engage each lamina. For example, the center holes of the laminations 12 and 16 need not be circular, but any other suitable shape, as for example, triangular, and the periphery of the hub portion upon which these laminations are positioned shaped correspondingly. The stresses upon the flanges 36 may thereby be reduced, as will appear more fully from the modification disclosed in Figures 4 and 5.

Figure 4:
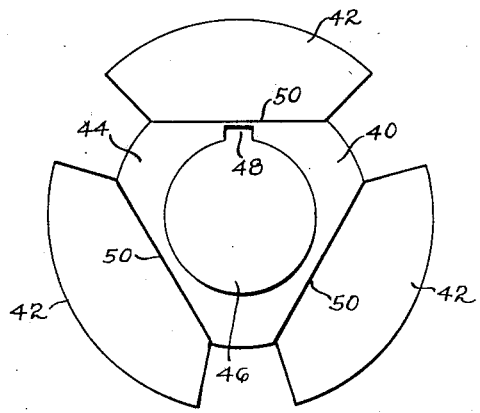
Figure 4 is an end elevational view of a modified hub member.
Figure 5:
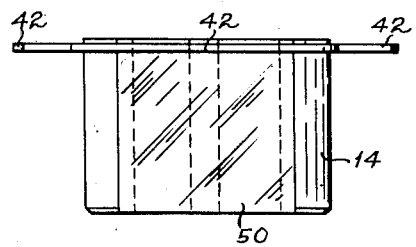
Figure 5 is a side elevational view thereof.

In Figures 4 and 5 a modified hub 40 has been shown. This hub includes the flanges 42 and the main hub portion 44 provided with an aperture 46 for the shaft and a key way 48. Instead of a key way, the hub could be secured to the shaft in any other suitable manner, as for example, by a spline. The main body portion of the hub on both sides of the flanges 42 has been provided with facets 50, upon which the edges of the lamination corresponding to laminations 12 and 16 are positioned. The hub may be made from metal, either machined or die cast or molded from powdered metal. By molding the member from powdered metal, the hub may be produced very accurately without any machining operations.

In the modification disclosed in Figure 6, the laminations 60, 62 and 64 are secured together by projection welding. This has been accomplished by providing projections 66 on the lamination 60 and projections 68 on the lamination 62. The projections on the lamination 60 are staggered with respect to the projections on the lamination 62, so that by placing the laminations between a pair of electrodes 70, shown schematically, the resistance between the tip of the projections and the adjacent laminations generates sufficient heat so as to weld the parts together.

For the purpose of illustration, three laminations have been disclosed. The number of laminations is a matter of choice, in that only two or more than three laminations may be used within the purview of this invention. Furthermore, the laminations have been disclosed in connection with a flanged hub. The laminations secured together, as disclosed, may be used with any other type of hub arrangement.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A wheel assembly including a hub, a wheel fixedly mounted upon the hub, said wheel including a plurality of flat metallic laminations, said laminations being secured together by spot welds, the spot welds joining a pair of laminations together being staggered with respect to the spot welds joining an adjacent lamination to one of the laminations of said pair.

2. A toothed wheel assembly including a plurality of flat metallic laminations, each provided with radially disposed teeth, said flat laminations being secured together by spot welds welded when the sheets are flat, the spot welds joining a pair of laminations together being staggered with respect to the spot welds joining an adjacent lamination to one of the laminations of said pair.

3. A toothed wheel assembly including a plurality of flat metallic laminations, each provided with radially disposed teeth, said laminations being secured together by spot welds welded when the sheets are flat, the spot welds joining a pair of laminations together being staggered with respect to the spot welds joining an adjacent lamination to one of the laminations of said pair, a hub member, and means for fixedly attaching the hub member to the laminations.

4. A toothed wheel assembly including a plurality of flat metallic laminations, each provided with radially disposed teeth, each of the laminations being provided with aligning holes so positioned that when the holes of the several laminations are aligned the radially disposed teeth are in registry, said laminations being secured together by spot welds welded while the sheets are flat, the spot welds joining a pair of laminations together being staggered with respect to the spot welds joining an adjacent lamination to one of the laminations of said pair.

5. A toothed wheel assembly including a plurality of flat metallic laminations, each provided with radially disposed teeth, each of the laminations being provided with aligning holes so positioned that when the holes of the several laminations are aligned the radially disposed teeth are in registry, said laminations being secured together by spot welds welded while the sheets are flat, the spot welds joining a pair of laminations together being staggered with respect to the spot welds joining an adjacent lamination to one of the laminations of said pair, a hub member, and means for fixedly attaching the hub member to the laminations.

6. A toothed wheel assembly including a plurality of metallic laminations, each provided with radially disposed teeth, at least two of the laminations being provided with centrally located holes and one of the laminations being provided with a centrally disposed hole having radially disposed dovetailed notches, a hub member having radially disposed flanges seated in the dovetailed notches, the thickness of the flanges being approximately equal to the thickness of the lamination having the dovetailed notches, and means for securing the laminations together to hold the laminations in fixed relation with respect to each other, there being at least one lamination on either side of the lamination having the dovetailed notches.

7. A toothed wheel assembly including a plurality of metallic laminations, each provided with radially disposed teeth, at least two of the laminations being provided with centrally located holes and one of the laminations being provided with a centrally disposed hole having radially disposed dovetailed notches, a hub member having radially disposed flanges seated in the dovetailed notches, the thickness of the flanges being approximately equal to the thickness of the lamination having the dovetailed notches, and spot welds for securing the laminations together to hold the laminations in fixed relation with respect to each other, the spot welds for securing adjacent laminations together being staggered with respect to the spot welds securing other laminations together, there being at least one lamination on either side of the lamination having the dovetailed notches.

8. A hub member for use with a laminated wheel, said hub member including a plurality of radially disposed flange-like sectors, and collar-like portions, one on either side of the flange-like sectors, said sectors being adapted to be positioned between two laminations.

9. A wheel assembly including a hub member having a plurality of radially disposed flange-like sectors, and collar-like portions, one on either side of the flange-like sectors, a plurality of laminations, one of the laminations having notches for snugly receiving the flange-like sectors, the other lamination having an aperture, the margins of which are snugly seated upon the collar-like portions, there being at least one lamination on each side of the flange-like sectors, and means for securing the laminations and the flange-like sectors of the hub together into a unitary structure.

10. A wheel assembly including a hub member having a plurality of radially disposed flange-like sectors, and collar-like portions, one on either side of the flange-like sectors, a plurality of laminations, one of the laminations having notches for snugly receiving the flange-like sectors, the other lamination having an aperture, the margins of which are snugly seated upon the collar-like portions, there being at least one lamination on each side of the flange-like sectors, and spot welds for securing the laminations together, some of the spot welds securing the laminations to the flange-like sectors.

11. A wheel assembly including a hub, a wheel fixedly mounted upon the hub, said wheel including a plurality of laminations, the outer laminations being provided with apertures, the apertures in the lamination on one side being staggered with respect to the apertures in the lamination on the opposite side, said laminations being secured together by spot welds positioned under said apertures.

12. A wheel including a plurality of laminations, the outer laminations being provided with apertures, the apertures in the lamination on one side being staggered with respect to the apertures in the lamination on the opposite side, said laminations being secured together by spot welds positioned under said apertures.

13. A wheel including a plurality of laminations, each including marginal gear teeth, and registering apertures for aligning the gear teeth on the laminations during assembly, the outer laminations being provided with electrode projecting holes, said holes in the lamination on one side being staggered with respect to the holes in the laminations on the other side, said laminations being secured together by spot welds positioned under said holes.

14. A wheel assembly including a hub, said hub including a main body portion having radially disposed projections, the main body portion on one side of said projections being provided with a non-circular periphery, a wheel fixedly mounted upon the hub, said wheel including a plurality of laminations, one of the laminations being provided with a centrally disposed opening having a contour adapted to snugly receive said radially disposed projections, at least one of the other laminations being provided with a non-circular opening snugly seated upon the non-circular opening on the hub.

15. A wheel assembly including a hub, said hub including a main body portion having radially disposed projections, the main body portion on one side of said projections being provided with a non-circular periphery, a wheel fixedly mounted upon the hub, said wheel including a plurality of laminations, one of the laminations being provided with a centrally disposed opening having a contour adapted to snugly receive said radially disposed projections, at least one of the other laminations being provided with a non-circular opening snugly seated upon the non-circular opening on the hub, and means for fixedly holding the laminations and the hub together.

16. A wheel assembly including a hub, said hub including a main body portion having radially disposed projections, the main body portion on one side of said projections being provided with a non-circular periphery, a wheel fixedly mounted upon the hub, said wheel including a plurality of laminations, one of the laminations being provided with a centrally disposed opening having a contour adapted to snugly receive said radially disposed projections, at least one of the other laminations being provided with a non-circular opening snugly seated upon the non-circular opening on the hub, and a plurality of spot welds for holding the laminations together.

17. A wheel assembly including a hub, said hub including a main body portion having radially disposed projections, the main body portion on one side of said projections being provided with a non-circular periphery, a wheel fixedly mounted upon the hub, said wheel including a plurality of laminations, one of the laminations being provided with a centrally disposed opening having a contour adapted to snugly receive said radially disposed projections, at least one of the other laminations being provided with a non-circular opening snugly seated upon the non-circular opening on the hub, and a plurality of staggered spot welds for holding the laminations together, some of said spot welds securing the laminations to the radially disposed projections on the hub.

18. The method of forming a laminated wheel by utilizing a welding device having electrodes including the steps of forming a centrally disposed metallic disc member, forming a pair of laterally disposed metallic disc members, forming holes in the laterally disposed disc members, assembling the laterally disposed disc members on opposite sides of the centrally disposed disc member with the holes of one of the laterally disposed disc members being staggered with respect to the holes in the other laterally disposed disc member, and spot welding adjacent disc members together by projecting one electrode through the holes in the other disc member to thereby form a laminated wheel.

19. The method of forming a laminated gear by utilizing a welding device having electrodes including the steps of forming a centrally disposed metallic disc member provided with gear teeth, forming a pair of laterally disposed metallic disc members, forming apertures in the laterally disposed disc members, said disc members being provided with gear teeth, assembling the laterally disposed disc members on opposite sides of the centrally disposed disc member with the gear teeth in registry, the apertures in one disc member being staggered with respect to the apertures in the other disc member, and spot welding adjacent disc members together by projecting one electrode through the apertures in the other disc member to thereby form a laminated gear.

20. The method of forming a laminated structure from sheet metal by utilizing a welding device having electrodes including the steps of providing a main body member forming one lamination, forming other laminations provided with apertures, mounting the laminations on each side of the main body member, the apertures in the laminations positioned on one side of the main body member being staggered with respect to the apertures in the laminations on the other side of the main body, spot welding the laminations together by projecting one electrode through the apertures in the laminations.

VINCENT FRANCIS CARRAHER.

REFERENCES CITED

The following references are of record in the file of this patent:

UNITED STATES PATENTS

| Number | Name | Date |
| --- | --- | --- |
| 846,549 | Clark | Mar. 12, 1907 |
| 1,634,674 | Mattice | July 5, 1927 |
| 1,767,465 | Ledwinka | June 24, 1930 |

FOREIGN PATENTS

| Number | Country | Date |
| --- | --- | --- |
| 429,459 | Great Britain | May 30, 1935 |